(12) United States Patent
Patel

(10) Patent No.: US 7,301,447 B2
(45) Date of Patent: Nov. 27, 2007

(54) LED TURN SIGNAL AND ERROR DETECTING METHOD

(75) Inventor: Vipul M. Patel, Livonia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 197 days.

(21) Appl. No.: 11/105,090

(22) Filed: Apr. 13, 2005

(65) Prior Publication Data

US 2006/0232394 A1 Oct. 19, 2006

(51) Int. Cl.
*B60Q 1/34* (2006.01)

(52) U.S. Cl. .................. 340/475; 340/458; 340/815.45

(58) Field of Classification Search ................ 340/475, 340/463, 468, 467, 464, 479, 815.4, 815.45
See application file for complete search history.

(56) References Cited

U.S. PATENT DOCUMENTS

| 4,654,629 A * | 3/1987 | Bezos et al. ............. 246/473.3 |
| 5,896,084 A * | 4/1999 | Weiss et al. ................ 340/468 |
| 5,955,945 A * | 9/1999 | Fuhrer ........................ 340/479 |
| 6,836,081 B2 * | 12/2004 | Swanson et al. ............ 315/307 |
| 6,844,681 B2 * | 1/2005 | Serizawa et al. ............. 315/77 |
| 2002/0179816 A1 * | 12/2002 | Haines et al. ............... 250/205 |

FOREIGN PATENT DOCUMENTS

| DE | 3042415 A1 | 7/1982 |
| DE | 19708659 C1 | 5/1998 |
| DE | 19852351 A1 | 5/2000 |
| DE | 10017878 A1 | 10/2001 |
| DE | 10107578 A1 | 8/2002 |
| DE | 10236862 A1 | 3/2004 |

* cited by examiner

*Primary Examiner*—Brent A. Swarthout

(57) ABSTRACT

A motor vehicle turn signal and a method for detecting an error in the turn signal are provided. The turn signal comprises a plurality of LEDs arranged in parallel banks and receiving current from a power source. A detector coupled to each of the parallel banks provides an error message if the current in one of the banks falls outside a predetermined limit. A current sink is coupled to the power source and is configured to be activated in response to the error message. When activated, the current sink causes a change in state of the power source. In accordance with one embodiment of the invention, detection of the change in state of the power source causes the generation of an error indicator to alert the driver to a turn signal malfunction.

17 Claims, 2 Drawing Sheets

LED TURN SIGNAL AND ERROR DETECTING METHOD

TECHNICAL FIELD

The present invention generally relates to a motor vehicle turn signal assembly and to a method for detecting an error in that turn signal assembly, and more particularly relates to a turn signal assembly including a plurality of light emitting diodes and to a method for detecting an error in one or more of the light emitting diodes.

BACKGROUND OF THE INVENTION

If a turn signal in a motor vehicle malfunctions, the malfunction must be detected and the driver of the motor vehicle must be notified. Older model turn signal systems use a single incandescent turn signal bulb on each side in the front of the vehicle and a single incandescent bulb on each side in the rear of the vehicle. The two bulbs, one front and one rear, are wired in parallel and each might draw as much as one ampere of current. If either bulb fails, usually as an open circuit, failure detection is relatively easy because of the large resulting change in the current supplied by the turn signal power supply. The resulting change in current can be detected, for example, as a change in the voltage drop across a resistor in series between the power supply and the two bulbs. Upon detection of a large change in the current from the turn signal power supply the driver of the motor vehicle can be alerted, for example, by causing the remaining turn signal and the dash board turn signal indicator to flash at an increased rate. The series resistor and the circuit for detecting the failure can be located in or near the dash board area of the motor vehicle in close proximity to circuitry needed to alert the driver.

The rear turn signal element in newer model motor vehicles turn signal systems can be a plurality of light emitting diodes (LEDs) instead of an incandescent bulb. The LEDs are usually arranged as a plurality of parallel banks of series connected LEDs. Individually each LED draws only a few tens of milliamps of current when operating. A failure of a single LED or even of a bank of LEDs causes only a small change in the total turn signal current. Failure of an LED in a rear turn signal element is difficult to detect by detection circuitry located in or near the dash board where the malfunction alert circuitry is located. Failure of a single LED or a small bank of LEDs causes such a small change in the total turn signal current that the change may be masked, for example, by noise on the power line extending from the rear of the motor vehicle to the dash board area. It has thus been common to place malfunction detection circuitry near the rear turn signal element where accurate detection of LED failure can be insured. A failure signal from the detection circuitry must then be transmitted to the malfunction alert circuitry over an error wire that runs from each rear turn signal assembly to the dash board. The extra error wires (one for each side of the vehicle) add to the cost of the motor vehicle and are a potential source of an additional failure mechanism.

Accordingly, it is desirable to provide a method for reliably and inexpensively detecting the failure of a light emitting diode in a motor vehicle turn signal assembly. In addition, it is desirable to provide a motor vehicle turn signal assembly that can detect malfunctioning of an LED in the assembly without additional wiring extending from the assembly to the dash board area. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A motor vehicle turn signal and a method for detecting an error in the turn signal are provided. The turn signal comprises a plurality of LEDs arranged in parallel banks and receiving current from a power source. A detector coupled to each of the parallel banks provides an error message if the current in one of the banks falls outside predetermined limits. A current sink is coupled to the power source and is configured to be activated in response to the error message. When activated, the current sink causes a change in state of the power source. In accordance with one embodiment of the invention, detection of the change in state of the power source causes the generation of an error indicator to alert the driver of a turn signal malfunction.

A method is provided for detecting a malfunction of an LED in an automotive turn signal assembly that comprises a plurality of LEDs coupled to a power supply line. The method comprises detecting the failure of at least one of the plurality of LEDs, and changing the state of the power supply line in response to detecting the failure.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
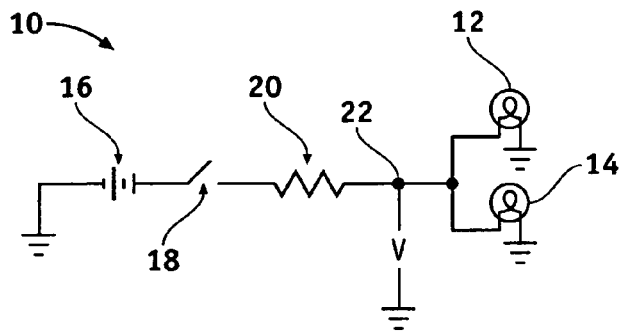
FIG. 1 illustrates schematically a prior art automotive turn signal assembly.

FIG. 1 schematically illustrates a prior art motor vehicle turn signal assembly 10. The turn signal assembly includes a front turn signal element 12 and a rear turn signal element 14, each mounted on one side of a motor vehicle and intended to indicate an intention to turn toward that side. Of course, similar turn signal elements (not illustrated) would be mounted on the opposite side of the motor vehicle to indicate an intention to turn in the opposite direction. The two turn signal elements are coupled in parallel to a source 16 of turn signal current through a resistor 20 and a switch 18. This description and figure are intended to be schematic only; those of skill in the art will realize that the assembly may be implemented with additional, other, or slightly different components. Turn signal elements 12 and 14 are incandescent bulbs that, when operative, each draw as much as one ampere of current. By monitoring the voltage at node 22 the current drawn by the two turn signal elements can be monitored. For example, the voltage at node 22 can be monitored by a comparator (not illustrated) or other logic circuit. Because the current drawn by each of the turn signal elements is relatively large, if one of the elements burns out a significant and easily measurable change in the voltage at node 22 is detected.

Figure 2:
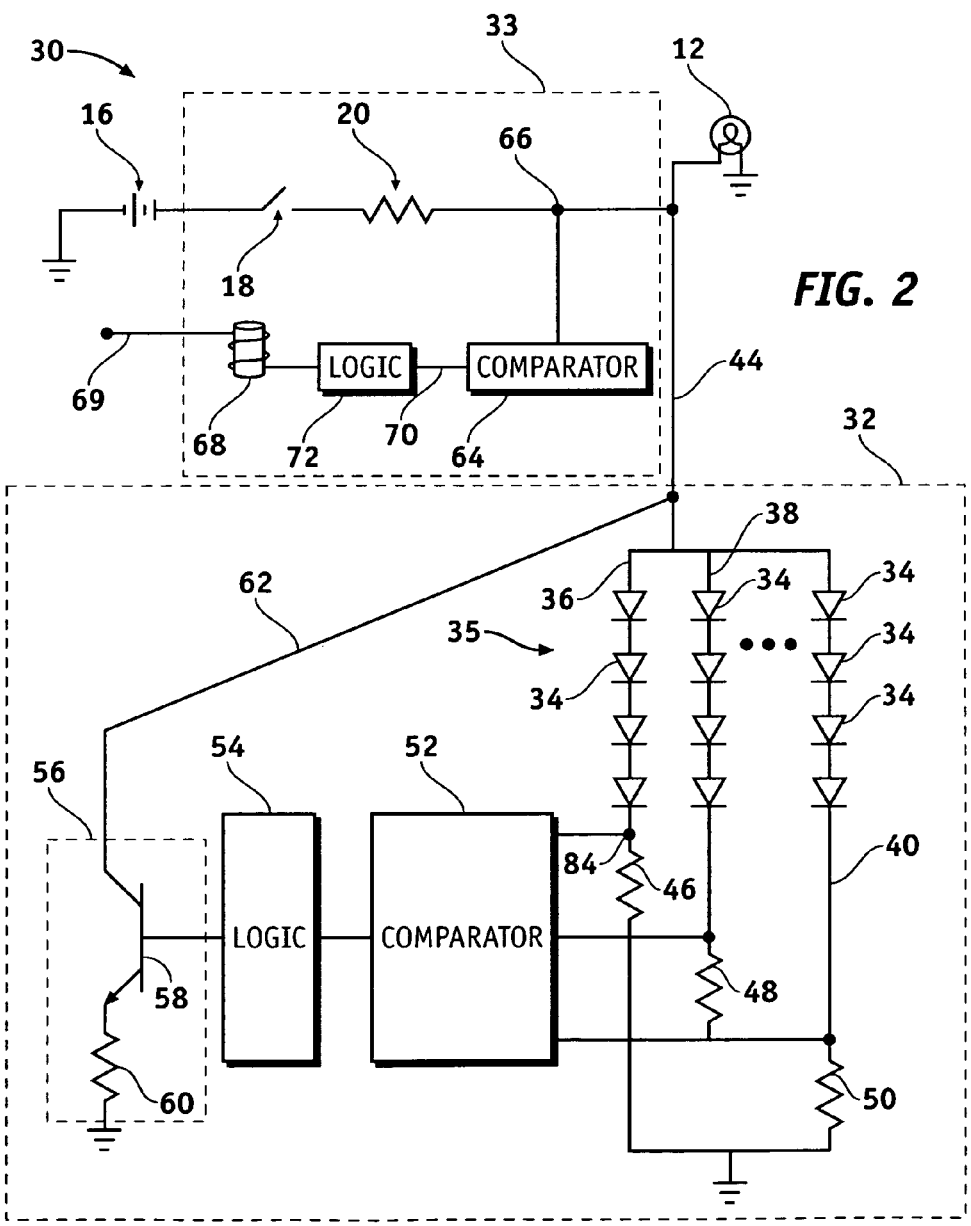
FIG. 2 schematically illustrates an automotive turn signal assembly in accordance with one embodiment of the invention.

FIG. 2 schematically illustrates a motor vehicle turn signal assembly 30 in accordance with one embodiment of the invention. In accordance with this exemplary embodiment of the invention, assembly 30 includes elements positioned at three locations in the motor vehicle. A front turn signal element 12 is located near the front of the motor vehicle and usually on a front fender. A rear turn signal element indicated by the dashed line 32 is located at a rear corner of the motor vehicle, for example on the rear fender of an automobile. A third element of the turn signal assembly, a control section, indicated by the dashed line 33, is located in or near the dashboard area of the motor vehicle. Interconnection of the three elements is explained below.

Front turn signal element 12 is, as before, an incandescent bulb. In this embodiment, however, rear turn signal element 32 is implemented as an array 35 of a plurality of light emitting diodes (LEDs) 34. The LEDs are preferably arranged in a plurality of parallel banks 36, 38, and 40 of series connected LEDs 34. Front turn signal element 12 and rear turn signal element 32 are coupled in parallel to a turn signal current source 16 by turn signal current carrying wire 44. A resistor 20 and a switch 18 are coupled in series with the turn signal current source. The front and rear turn signal elements are turned on by selectively and periodically sourcing a turn signal current to the turn signal elements in response to the driver activating the turn signal stalk.

The number and arrangement of both the LEDs and the parallel banks in array 35 depend on the configuration of the particular motor vehicle in which they are mounted. The number and configuration can depend, for example, on the shape and size of the tail light assembly. Array 35 of LEDs may include, for example, ten parallel banks each having four series connected LEDs 34. The total current drawn by the array may be about one ampere when the turn signal is turned on, a current that is comparable to the current drawn by an incandescent bulb. In an exemplary configuration having ten parallel branches, the current through each branch is only about 100 milliamperes (mA). If one of the LEDs open circuits so that no current is flowing through the corresponding bank, the change in current drawn by the rear turn signal assembly is only about 100 mA. If, instead, one of the LEDs shorts out, the current through the corresponding bank may change by about 25 mA. In either case, the change in total turn signal current caused by a malfunction of one of the array of LEDs is much smaller than the change in current experienced by the failure of a turn signal bulb in the prior art turn signal system, and the change is difficult to detect by the prior art detection methods.

In accordance with an embodiment of the invention small resistors 46, 48, 50 are coupled in series in banks 36, 38, 40, respectively. One end of each of the resistors can be coupled to ground. By measuring the voltage drop across resistors 46, 48, 50, the current flow through each of the banks can be monitored, for example by a comparator circuit 52. If the current through any of the banks of series connected LEDs is determined to be abnormal, indicating a malfunction of one or more of the LEDs, a logic circuit 54 coupled to receive the output of comparator circuit 52 causes an error signal to be generated and transmitted to a current sink element 56 coupled between the turn signal current carrying wire 44 and ground. In accordance with one embodiment of the invention current sink element 56 comprises variable impedance element that can be activated by the signal from logic circuit 54 and preferably comprises an NPN bipolar transistor 58 in series with a resistor 60. The base of transistor 58 receives the error signal from logic circuit 54. The emitter of transistor 58 is coupled to resistor 60 which, in turn, is connected to ground. The collector of transistor 58 is coupled to wire 44 through a short wire 62. In the event of a malfunction by one or more of LEDs 34, the error signal from logic circuit 54 causes transistor 58 to turn on, i.e., to become conductive. When transistor 58 turns on, wire 44 carrying turn signal current is shorted to ground through transistor 58 and resistor 60. The resistance of resistor 60 is selected so that the act of shorting wire 44 to ground through the resistor causes an easily detectable change in the current flowing through wire 44. The state of the power supply line is thus changed in response to detecting a malfunction in one or more of the LEDs. A field effect transistor or other variable impedance devices can also be used in place of NPN transistor 58. If a field effect transistor is used, the gate of the transistor would be coupled to receive the error signal from logic circuit 54.

Control section 33 of the turn signal assembly includes switch 18 and resistor 20 as well as a comparator circuit 64 or other means for monitoring the voltage at node 66. Monitoring the voltage at node 66 effectively monitors the current flowing to the front and rear turn signal elements and thus the status of the turn signal assembly. A significant change in the voltage at node 66 indicates a change in state of the power supply line, and that, in turn, indicates a malfunction has occurred in at least one of the turn signal elements. Control section 33, in accordance with one embodiment of the invention, also includes a relay coil 68. Relay coil 68 is coupled to the turn signal stalk (not illustrates) through line 69 and is energized when the driver of the motor vehicle moves the stalk to activate the turn signals. Moving the turn signal stalk causes relay coil 68 to be periodically energized to periodically close switch 18 and to cause the turn signals to flash on and off. Circuitry for periodically energizing relay coil 68 is conventional and has not been illustrated.

If a malfunction in either of the turn signal elements occurs, that is, if the front turn signal element burns out or if one or more of the LEDs in the rear turn signal element malfunctions, the driver of the motor vehicle should be notified. In accordance with an embodiment of the invention, as described above, a malfunction of either the front or the rear turn signal elements will cause a change in state of the power supply line supplying turn signal current to the turn signal elements. A change in state of the power supply line will cause a voltage change at node 66 and the change at node 66 will be detected by comparator circuit 64. A change in state of the power supply line detected by comparator circuit 64 can be conveyed to the driver of the motor vehicle as an alert alarm by generating an error signal on line 70. The error signal is processed by logic circuit 72 to change the periodicity of energizing relay coil 68. For example, the periodicity can be doubled so that the turn signals and the conventional turn signal indicator on the dashboard both flash at twice the normal rate as an alert alarm. Although in the illustrative embodiment switch 18 is controlled by relay coil 68, in alternate embodiments the switch and coil can be replaced, for example, by solid state components energized by activating the turn signal stalk. The solid state components serve the same purpose as the relay coil and switch.

Comparator circuit 52, logic circuit 54, current sink element 56, wire 62, and array 35 can all be located in close proximity to each other within the rear turn signal or rear tail light assembly. No extra wires are needed to transmit error data from the rear turn signal element 32 to control section 33 located in the dashboard area. Preferably comparator circuit 52, logic circuit 54 and current sink element 56 are all located on a single PC board in the rear turn signal assembly. Other elements such as regulators, control switches and the like which may also be incorporated in the rear turn signal assembly may also be included on that PC board. These elements are well known to those of skill in the art and have not been discussed or illustrated.

Figure 3:
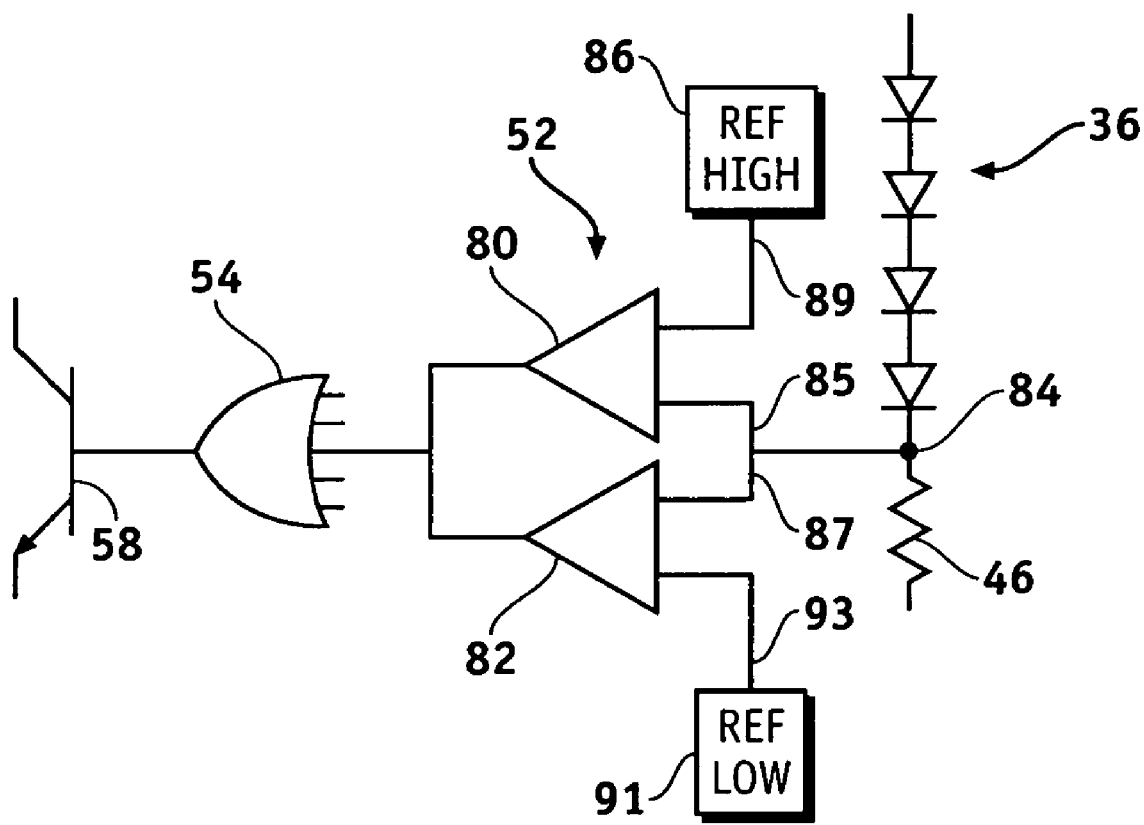
FIG. 3 illustrates a comparator circuit for use in accordance with one embodiment of the invention.

FIG. 3 schematically illustrates a comparator circuit 52 and a logic circuit 54 that can be used to monitor the voltage across, for example, resistor 46 in rear turn signal assembly 32 as illustrated in FIG. 2. Comparator circuit 52 includes comparators 80 and 82. A lead from node 84 is coupled to the low input 85 of comparator 80 and to the high input 87 of comparator 82. A high voltage reference 86 is coupled to the high input 89 of comparator 80 and a low voltage reference 91 is coupled to the low input 93 of comparator 82. If the nominal current through bank 36 is expected to be about 100 mA, the high voltage reference can be set, for example, to cause comparator 80 to trip if the current through bank 36 exceeds about 120 mA. Correspondingly, the low voltage reference can be set, for example, to cause comparator 82 to trip if the current through bank 36 is less than about 80 mA. Similar comparator pairs (not illustrated) can monitor the current in the other banks of the array of LEDs. The output of each of the comparator pairs can be coupled as inputs to logic circuit 54. Logic circuit 54 can be, for example, a multiple input OR gate. The additional inputs to logic circuit 54 correspond to inputs from comparators coupled to the other banks of assembly 32. If the output of any of the comparators is high the OR gate outputs a high signal that causes transistor 58 to conduct.

Comparator 64 that monitors the voltage at node 66 can be similar to comparator circuit 52 except that different values will be set for the high and low voltage references. The high and low voltage references for comparator circuit 64 can be set, for example, to cause the comparators to trigger if the nominally 2 ampere turn signal current is outside the range from about 1.8 ampere to about 2.2 ampere.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for conveying to a driver of a motor vehicle a failure of a light emitting diode in a rear turn signal assembly comprising a plurality of light emitting diodes coupled to a power supply line, the method comprising the steps of:
   detecting the failure of at least one of the plurality of light emitting diodes;
   transmitting a first error signal in response to detecting the failure;
   changing a state of the power supply line in response to the first error signal;
   detecting the change of state of the power supply line; and
   transmitting a second error signal in response to detecting the change of state.

2. The method of claim 1 wherein the plurality of light emitting diodes are arranged as a plurality of parallel banks of series connected light emitting diodes and wherein the step of detecting the failure comprises the step of detecting a change in current through one of the parallel banks.

3. The method of claim 2 wherein the step of detecting the change of current comprises the step of comparing a voltage drop across a resistor connected in series with the one of the parallel banks to a reference voltage.

4. The method of claim 2 wherein the step of changing the state of the power supply line comprises the step of activating an impedance element coupled between the power supply line and a ground terminal in response to detecting a change in current.

5. The method of claim 1 further comprising the step of activating an alert alarm in response to the second error signal.

6. A method for detecting a failure of a light emitting diode in a motor vehicle turn signal assembly comprising a plurality of light emitting diodes, the method comprising the steps of:
   arraying the plurality of light emitting diodes in a plurality of parallel coupled banks of series connected light emitting diodes;
   supplying turn signal current to the plurality of banks of light emitting diodes in response to activation of a turn signal switch;
   measuring a turn signal bank current in each of the plurality of banks of light emitting diodes;
   detecting a change exceeding a predetermined amount in the turn signal bank current supplied to one of the plurality of banks of light emitting diodes in response to an error in one of the plurality of light emitting diodes;
   transmitting a first error signal in response to the step of detecting a change;
   activating a current sink in response to the step of transmitting the first error signal, the current sink coupled to cause a measurable change in the turn signal current;
   detecting the measurable change in the turn signal current; and
   transmitting a second error signal in response to the step of detecting the measurable change.

7. The method of claim 6 wherein the step of activating the current sink comprises the step of turning ON a transistor coupled between a source of turn signal current and a ground terminal.

8. A motor vehicle turn signal comprising:
   a front turn signal element;
   a rear turn signal assembly comprising a plurality of light emitting diodes coupled in a plurality of parallel banks of series coupled light emitting diodes, the rear turn signal assembly coupled in parallel to the front turn signal element;
   a power source coupled to supply current to the front turn signal element and the rear turn signal assembly in parallel;
   a first detector coupled to the power source and configured to detect a change in the current supplied by the power source and configured transmit a first error message in response to detecting the change;

a second detector coupled to each of the parallel banks of light emitting diodes and configured to detect a malfunction in one of the light emitting diodes and configured to transmit a second error signal in response to detecting the malfunction; and a current sink coupled to the second detector and to the power source and configured to, in response to the second error signal, cause a sufficient change in the current supplied by the power source to be detectable by the first detector.

9. The motor vehicle turn signal of claim 8 wherein the first detector comprises a comparator configured to provide the first error signal in response to the comparator determining that the current supplied by the power source is outside predetermined limits.

10. The motor vehicle turn signal of claim 9 further comprising a failure indicator configured to alert a driver in response to receiving the first error signal.

11. The motor vehicle turn signal of claim 8 wherein the second detector comprises a comparator configured to provide the second error signal in response to the comparator determining that a current flowing in one of the parallel banks is outside a predetermined limit.

12. The motor vehicle turn signal of claim 11 wherein the current sink comprises a transistor coupled in series with a resistor between the power source and a ground terminal and wherein the transistor is configured to be turned on by the second error signal.

13. A motor vehicle turn signal assembly comprising:
a plurality of parallel banks of series coupled light emitting diodes;
a power source selectively supplying current to the plurality of banks;
a comparator circuit coupled to each of the plurality of banks and configured to provide a first error signal in response to a current in one of the plurality of banks being outside a predetermined range;
a current sink coupled to the power source and configured to activate in response to reception of the first error signal to cause a change in state of the power source; and
a detector configured to detect the change in state of the power source and to generate a second error signal in response to detecting the change in state.

14. The motor vehicle turn signal assembly of claim 13 further comprising a driver detectable error indicator activated in response to the second error signal.

15. The motor vehicle turn signal assembly of claim 13 wherein the current sink comprises a transistor coupled between the power source and a ground terminal and configured to be turned ON by the first error signal.

16. The motor vehicle turn signal assembly of claim 13 wherein the comparator circuit comprises a plurality of comparators, each configured to monitor current in a corresponding one of the parallel banks of series connected light emitting diodes.

17. The motor vehicle turn signal assembly of claim 13, wherein the plurality of parallel banks of series coupled light emitting diodes, the comparator circuit, and the current sink form a rear turn signal, the motor vehicle turn signal assembly further comprising:
an incandescent light coupled in parallel to the rear turn signal, the incandescent light forming a front turn signal.

* * * * *